3,741,955
3β-HYDROXY - 14,15β-OXIDO - 14β-BUFA-4,20,22-TRIENALIDE-3β-(α-L-RHAMNOPYRANOSIDE)

Kurt Radscheit, Kelkheim, Taunus, Ulrich Stache, Hofheim, Taunus, Werner Fritsch, Neuenhain, Taunus, Werner Haede, Hofheim, Taunus, and Ernst Lindner, Frankfurt am Main, Germany, assignors to Farbwerke Hoechst Aktiengesellschaft vormals Meister Lucius & Bruning, Frankfurt am Main, Germany
No Drawing. Filed Apr. 6, 1971, Ser. No. 131,808
Claims priority, application Germany, Apr. 8, 1970, P 20 16 704.8
Int. Cl. C07c *173/00*
U.S. Cl. 260—210.5       1 Claim

ABSTRACT OF THE DISCLOSURE

Cardioactive 3β - hydroxy-14,15β-oxido-14β-bufa-4,20,22-trienolide-3β-(α-L-rhamnopyranoside).

Method of making this compound by acylating and dehydrating proscillaridin; forming a halohydrin from the resulting Δ¹⁴-olefin; dehydrohalogenating to form the 14,15β-epoxide; and hydrolyzing to form the free L-rhamnopyranoside.

---

The present invention relates to 3β-hydroxy-14,15β-oxido - 14β - bufa-4,20,22-trienolide-3β-(α-L-rhamnopyranoside).

The hitherto known compounds of the steroid bufadienalide series having with an epoxide structure in the 14,15β-position of the steroid molecule, for example, resibufogenin, marinobufagin and cinobufagin, are toad bufadienolides which do not contain the sugar component present in other cardiac glycosides. Therefore, they have not been used in cardiac therapy.

It has already been proposed to prepare 14,15β-oxydo-cardadienolides and -bufatrienolides which have a distinguished cardiac activity, for example by the reaction of 3-oxo-cardatrienolides and -bufatetraenolides with N-halogenoamides and subsequent splitting off of the hydrohalic acid.

Upon further investigations in the field of these compounds, it has now been found that, unexpectedly, the α-L-rhamnoside of a Δ⁴-anhydro-marinobufagin, namely 3β-hydroxy-14,15β-oxido-14β-bufa-4,20,22-trienolide, 3β-(α-L-rhamnopyranoside) of the Formula I

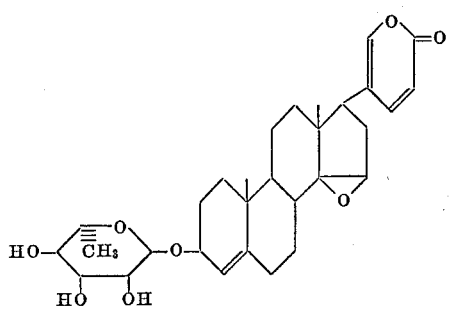

(I)

can be obtained by reacting proscillaridin (II) with an acylating agent, treating the acylate (III) obtained with a dehydrating agent, reacting the so-obtained Δ¹⁴-olefin (IV) with N-halogeno-amides or hypohalous acids, reacting the so-obtained halogenohydrin (V) with agents splitting off hydrohalic acid to give the epoxide (VI) and hydrolyzing the latter to obtain the free L-rhamnoside.

The individual steps of this process are illustrated in the following reaction scheme:

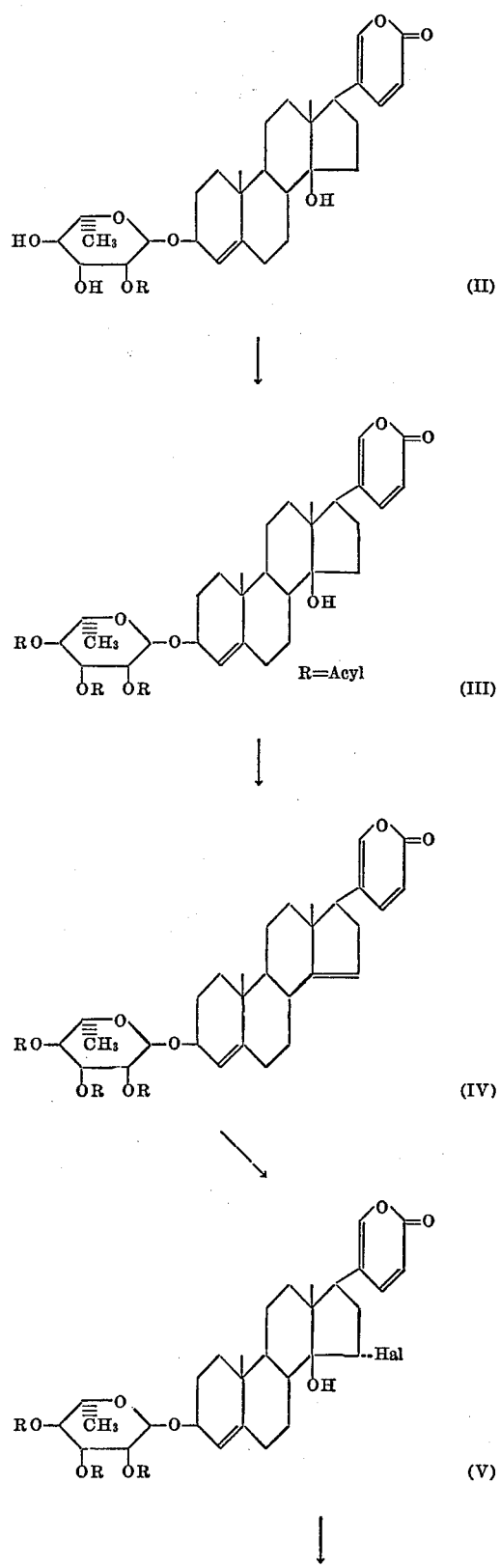

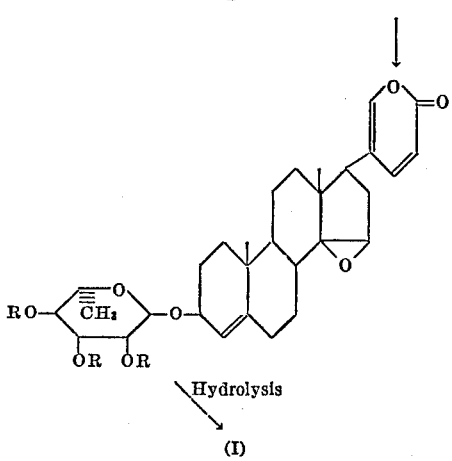

(VI)

Hydrolysis (I)

The acylation of proscillaridin to give the acylate (III) is effected in a manner known per se, for example by reaction with acid halides or anhydrides of monocarboxylic acids. As acyl radicals of monocarboxylic acids there may be mentioned, for example the formyl, acetyl, propionyl, butyryl, benzoyl and p-nitrobenzoyl radical.

The dehydration (III–IV) is effected by reaction of the 14-hydroxy compounds (III) with agents splitting off water. For this purpose, for example thionyl chloride, phosphoroxy chloride or sulfuryl chloride in the presence of tertiary bases, preferably thionyl chloride in pyridine, may be used, if necessary with addition of an inert solvent such as benzene, toluene, diethylether, tetrahydrofurane, chloroform or methylene chloride. The reaction may be effected in suspension or in solution. The reaction is carried out at temperatures in the range from −30° C. to the boiling temperature of the solvent mixture, preferably at 0° C. The reaction time is 30 minutes to 20 hours. For example, dehydration is effected with thionyl chloride/pyridine at 0° C. within 2 hours.

The preparation of the halogenohydrins (V) starting from the olefins (IV) is effected in a manner known for analogous cases with N-halogeno-amides or hypohalous acids, for example with N-bromo-acet-amide in the presence of perchloric acid or, advantageously, with N-bromosulfonamides of aromatic sulfonic acids, for example N,N-dibromobenzene-sulfonamide in a weakly acidic medium, for example in an acetic medium, in inert solvents, for example in dioxane. The reaction is carried out at temperatures in the range from −30° C. to +30° C. within 30 minutes up to several hours. The halogenohydrins of Formula V so-obtained may be converted either immediately in the reaction mixture or after having been isolated, without further purification, into the 14,15β-oxydo compounds of the Formula VI.

This process step is effected by reaction with weak alkalies for example a mixture of sodium acetate/glacial acetic acid in methanol having a pH of 7.4 or by treatment with basic or neutral or acidic aluminum oxide, for example that used in chromatography, in a solvent which is inert towards aluminum oxide, or with tertiary organic bases, for example pyridine, collidine, triethylamine or 1,5-diazabicyclo[4.3.0]-5-nones.

The hydrolysis of the acylated compounds of the Formula VI to yield the compounds of the Formula I is effected in the manner usual in carbohydrate chemistry or in the hydrolysis of acylated cardiac glycosides, for example by means of methanolic ammonia or with potassium bicarbonate in aqueous methanol, with alkali metal alcoholate or with alkaline earth metal alcoholate.

The fact that the process according to the invention succeeded was surprising, because, on the one hand, the sugar radical in the 3-position could have been split off and, on the other hand, it was not foreseeable that in the compounds of Formula IV the $\Delta^{14}$ double bond, of the two isolated double bonds in the $\Delta^4$- and $\Delta^{14}$-position, could be reacted selectively to yield a 14,15-halogenohydrin.

The product of the Formula I obtained according to the invention is distinguished by a strong positive inotropic action and a strongly marked cardiac activity. As a glycoside, it has, in comparison with comparable aglycones, more favorable properties with regard to solubility, distribution, and resorption in the organism. It is, therefore, suitable for the therapy of cardiac damage, especially for cardiac insufficiency and tachycardia. The product is administered preferably orally in the form of tablets or dragées which contain, in addition to the active ingredient, the usual adjuvants and excipients, for example lactose, starch, tragacanth, etc.

The product of the invention may also be used as an intermediate product in the manufacture of other cardioactive steroids.

The following example illustrates the invention:

EXAMPLE

The melting points were determined with the aid of the apparatus by Dr. Tottoli (Büchi).

(a) Proscillaridin-triacetate.—5 g. of proscillaridin were dissolved in 62 ccm. of pyridine, combined with 33 ccm. of acetic acid anhydride, heated for 2 and ½ hours to 100° C. and then allowed to stand for 16 hours at room temperature. The precipitate obtained by stirring the reaction mixture into 2 liters of ice-water was washed with water, dried over $P_2O_5$, and dissolved for further purification in a small amount of methylene chloride and filtered over silica gel. The combined residues obtained upon elution with methylene chloride and ethyl acetate were crystallized in petroleum ether. 6 grams of product melting at 135–145° C. were obtained. $[\alpha]_D^{20} = -64.9°$ (chloroform).

(b) 3β-hydroxy-bufa - 4,14,20,22 - tetraenolide,3β-(α-L-rhamnopyranoside-triacetate).—5 grams of proscillaridin-triacetate were dissolved in 20 ccm. of pyridine and 11 ccm. of pyridine and combined, at 0° C., with 23 ccm. of a mixture of 30 ccm. of benzene, 10 ccm. of pyridine and 2 ccm. of thionyl chloride, within 10 minutes. The whole was then stirred for 2 hours at 0° C. The reaction mixture was poured into 100 ccm. of ice-water, extracted with methylene chloride, the extract was washed successively with dilute hydrochloric acid, water, 2N $Na_2CO_3$ solution and water, dried over sodium sulfate and evaporated under reduced pressure. For purification, the residue was dissolved in a mixture of benzene and di-ethyl ether and filtered over silica gel. The residue obtained upon evaporation of the filtrate was stirred into about 25 ccm. of water, the crystalline product was filtered off and dried over $P_2O_5$. Melting point: 106–112° C.

$$[\alpha]_D^{20} = -46.4°$$

$(CH_3OH)$.

(c) 3β-hydroxy-14,15β - oxido - 14β - bufa-4,20,22-trienolide, 3β-(α-L-rhamnopyranoside-triacetate).—3 grams of 3β - hydroxy - bufa - 4,14,20,22-tetraenolide,3β-(α-L-rhamnopyranoside-triacetate) were dissolved in 70 ccm. of dioxane and combined successively with 14.4 ccm. of water, 1.5 ccm. of glacial acetic acid and 1.2 g. N,N-dibromobenzene-sulfonamide. The reaction mixture was allowed to stand for 2 hours at 0° C. in the dark and then poured into an ice-cold solution of sodium thiosulfate. The precipitate was filtered off and dried over $P_2O_5$ at room temperature in a high vacuum. The 14,15-bromohydrin so-obtained was then directly further used:

2.8 grams of bromohydrin were dissolved in 80 ccm. of methylene chloride, combined with 30 g. of neutral aluminum oxide "Woelm" having an activity degree of II and the reaction mixture was stirred for 1 hour at room temperature with exclusion of light. After removal by filtration of the aluminum oxide, which had been washed several times with fresh methylene chloride, the solution was evaporated under reduced pressure, the residue was crystallized in a mixture of methanol and diethyl ether and recrystallized from methanol. Melting point: 147–151° C. $[\alpha]_D^{20} = -64.6°$ (chloroform).

*Elementary analysis* (percent): C, 66.4; H, 6.8; O, 27.1.

(d) 3β - hydroxy - 14,15β - oxido-14β-bufa-4,20,22-trienolide, 3β-(α-L-rhamnopyranoside).—800 mg. of the product prepared according to (c) were dissolved in 60 ccm. of absolute methanol and combined with 12 ccm. of a methanolic NH$_3$-solution saturated at 0° C. The mixture was allowed to stand for 20 hours at 0° C., then evaporated to dryness under reduced pressure at 40° C., the residue was dissolved in a mixture of methylene chloride and ethyl acetate and the solution was filtered over silica gel. The eluate obtained with ethyl acetate was evaporated and the residue so-obtained was crystallized in methanol and recrystallized from a mixture of methanol and diethyl ether. Melting point: 190–192° C. $[\alpha]_D^{20} = -73.0°$ (chloroform).

We claim:
1. 3β - hydroxy - 14,15β - oxido-14β-bufa-4,20,22-trienolide-3β-(α-L-rhamnopyranoside).

References Cited
UNITED STATES PATENTS

| | | | |
|---|---|---|---|
| 3,341,523 | 9/1967 | Komeno | 260—239.55 R |
| 3,346,603 | 10/1967 | Lefebvre et al. | 260—239.55 R |
| 3,406,190 | 10/1968 | Hogg et al. | 260—239.55 R |
| 3,472,836 | 10/1969 | Vogelsang et al. | 260—210.5 |

LEWIS GOTTS, Primary Examiner

J. R. BROWN, Assistant Examiner

U.S. Cl. X.R.

424—182